(12) United States Patent
Skallebæk et al.

(10) Patent No.: US 10,830,625 B2
(45) Date of Patent: Nov. 10, 2020

(54) WATER METER PLATFORM

(71) Applicant: Kamstrup A/S, Skanderborg (DK)

(72) Inventors: Anders Skallebæk, Skanderborg (DK); Peter Schmidt Laursen, Skanderborg (DK)

(73) Assignee: Kamstrup A/S, Skanderborg (DK)

( * ) Notice: Subject to any disclaimer, the term of this patent is extended or adjusted under 35 U.S.C. 154(b) by 63 days.

(21) Appl. No.: 16/096,972

(22) PCT Filed: Apr. 28, 2017

(86) PCT No.: PCT/DK2017/050129
§ 371 (c)(1),
(2) Date: Oct. 26, 2018

(87) PCT Pub. No.: WO2017/186248
PCT Pub. Date: Nov. 2, 2017

(65) Prior Publication Data
US 2019/0113376 A1 Apr. 18, 2019

(30) Foreign Application Priority Data

Apr. 28, 2016 (DK) .................................. 2016 70266
Feb. 23, 2017 (DK) .................................. 2017 70135

(51) Int. Cl.
| | | |
|---|---|---|
| *G01F 1/66* | (2006.01) | |
| *G01F 15/14* | (2006.01) | |
| *G01F 15/00* | (2006.01) | |
| *F16K 27/04* | (2006.01) | |
| *F16K 37/00* | (2006.01) | |
| *F16K 27/06* | (2006.01) | |

(52) U.S. Cl.
CPC ............ *G01F 15/14* (2013.01); *F16K 27/041* (2013.01); *F16K 27/067* (2013.01); *F16K 37/005* (2013.01); *G01F 1/662* (2013.01); *G01F 15/005* (2013.01); *G01F 15/003* (2013.01)

(58) Field of Classification Search
CPC combination set(s) only.
See application file for complete search history.

(56) References Cited

U.S. PATENT DOCUMENTS

| | | | | |
|---|---|---|---|---|
| 8,806,957 | B2 * | 8/2014 | Laursen .................. | G01F 1/662 |
| | | | | 73/861.18 |
| 2012/0193559 | A1 * | 8/2012 | Benson ..................... | G01F 3/12 |
| | | | | 251/129.01 |
| 2014/0338464 | A1 * | 11/2014 | Ball ........................ | G01F 15/14 |
| | | | | 73/861 |

FOREIGN PATENT DOCUMENTS

| | | | | |
|---|---|---|---|---|
| EP | 2336732 | A1 | 6/2011 | |
| EP | 2450675 | A2 * | 5/2012 | ........... G01F 15/066 |

(Continued)

OTHER PUBLICATIONS

The International Search Report and the Written Opinion of the International Searching Authority for Corresponding International Application PCT/DK2017/050129 dated Jul. 6, 2017.

*Primary Examiner* — Jewel V Dowtin
(74) *Attorney, Agent, or Firm* — Renner, Otto, Boisselle & Sklar, LLP

(57) ABSTRACT

The invention relates to a water meter platform and a housing component for a water meter platform. The housing component providing a flow tube, a sealable main compartment adapted to house a meter unit for measuring a flow of a fluid flowing through the flow tube and a flow channel interface in fluid communication with the flow tube adapted for mounting additional functional units.

17 Claims, 8 Drawing Sheets

(56) References Cited

FOREIGN PATENT DOCUMENTS

| EP | 2450675 A2 | 5/2012 | |
|----|---|---|---|
| WO | 2016025919 A1 | 2/2016 | |
| WO | WO-2016025919 A1 * | 2/2016 | ............. G08B 5/222 |

* cited by examiner

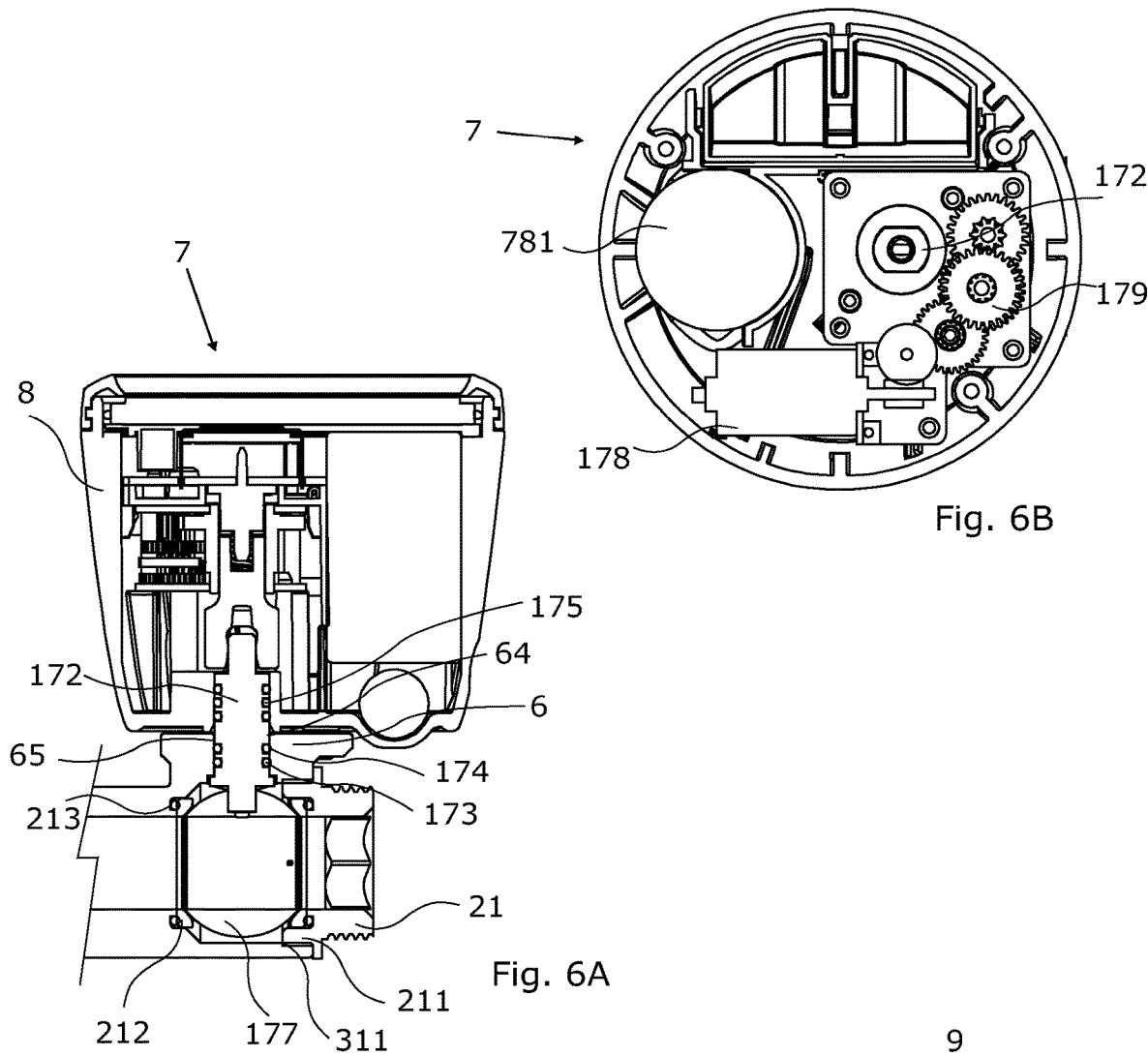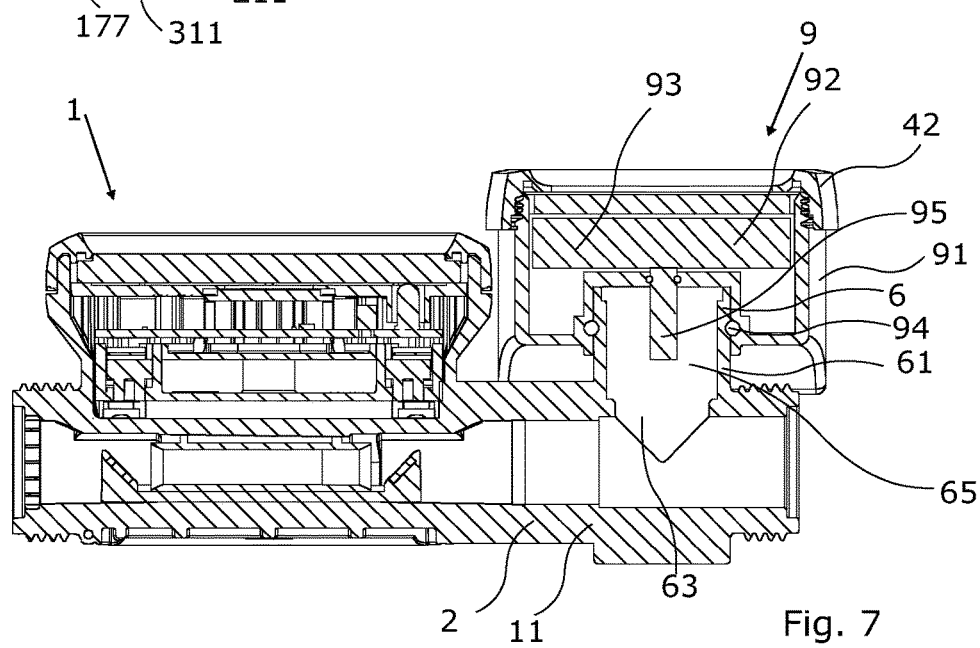

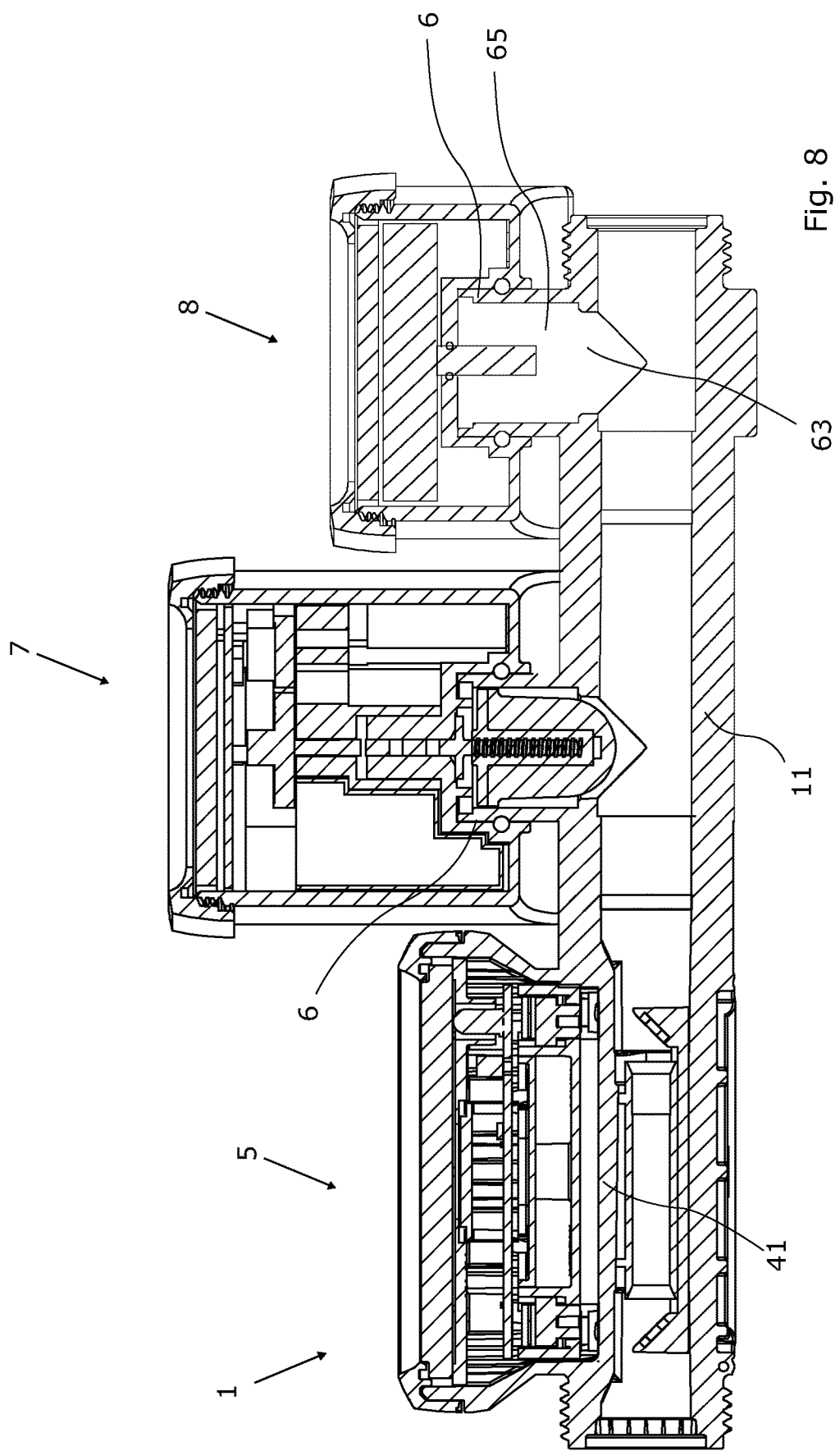

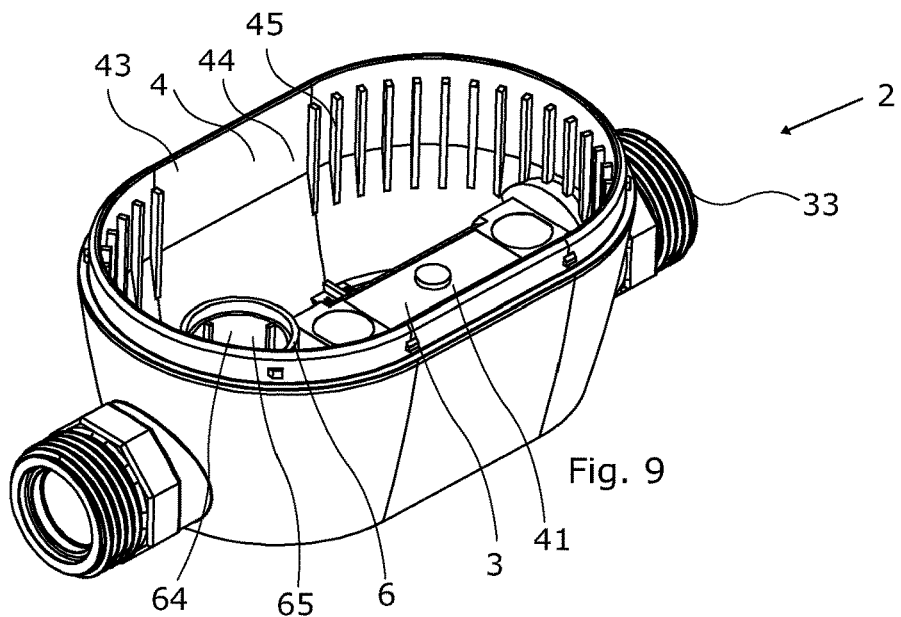
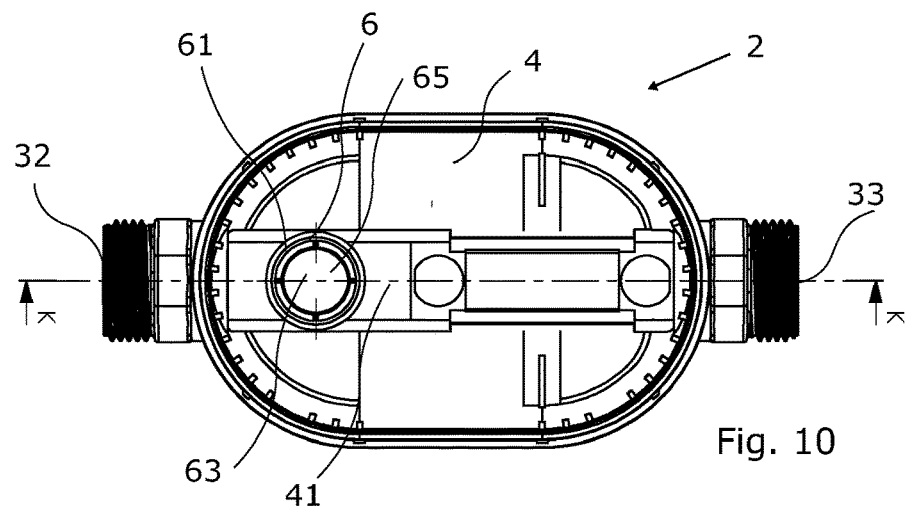
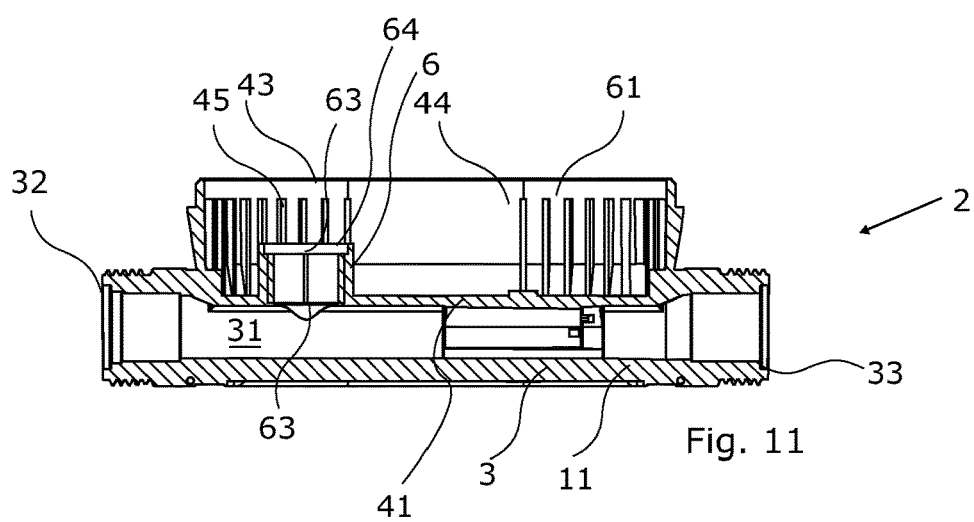

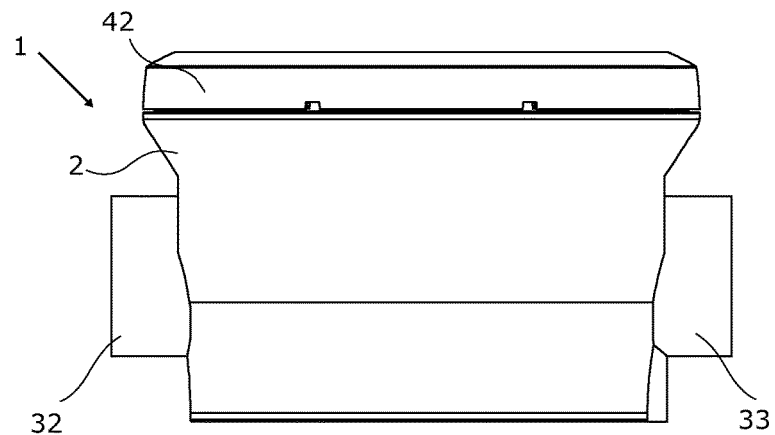
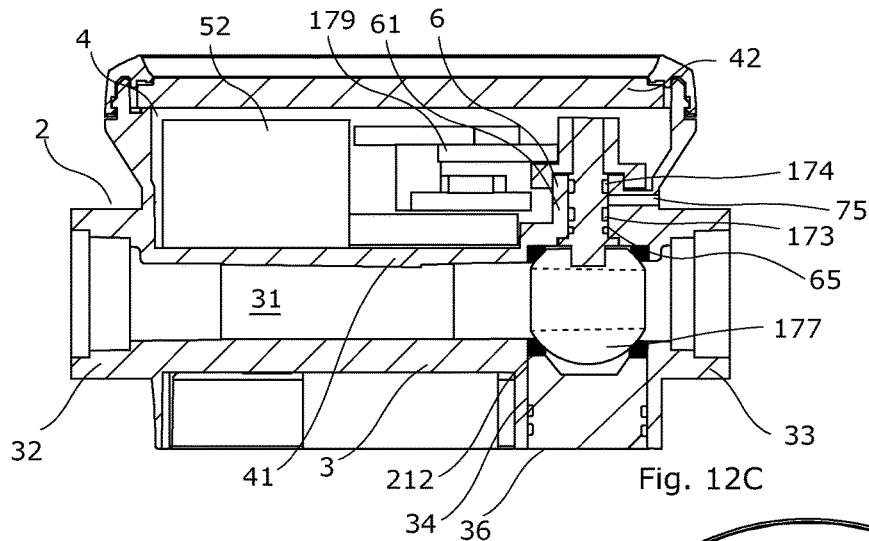
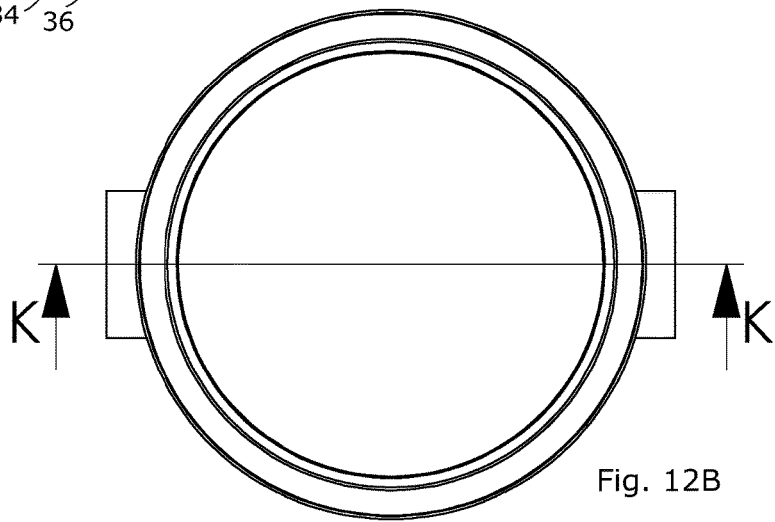
Fig. 12A
Fig. 12C
Fig. 12B

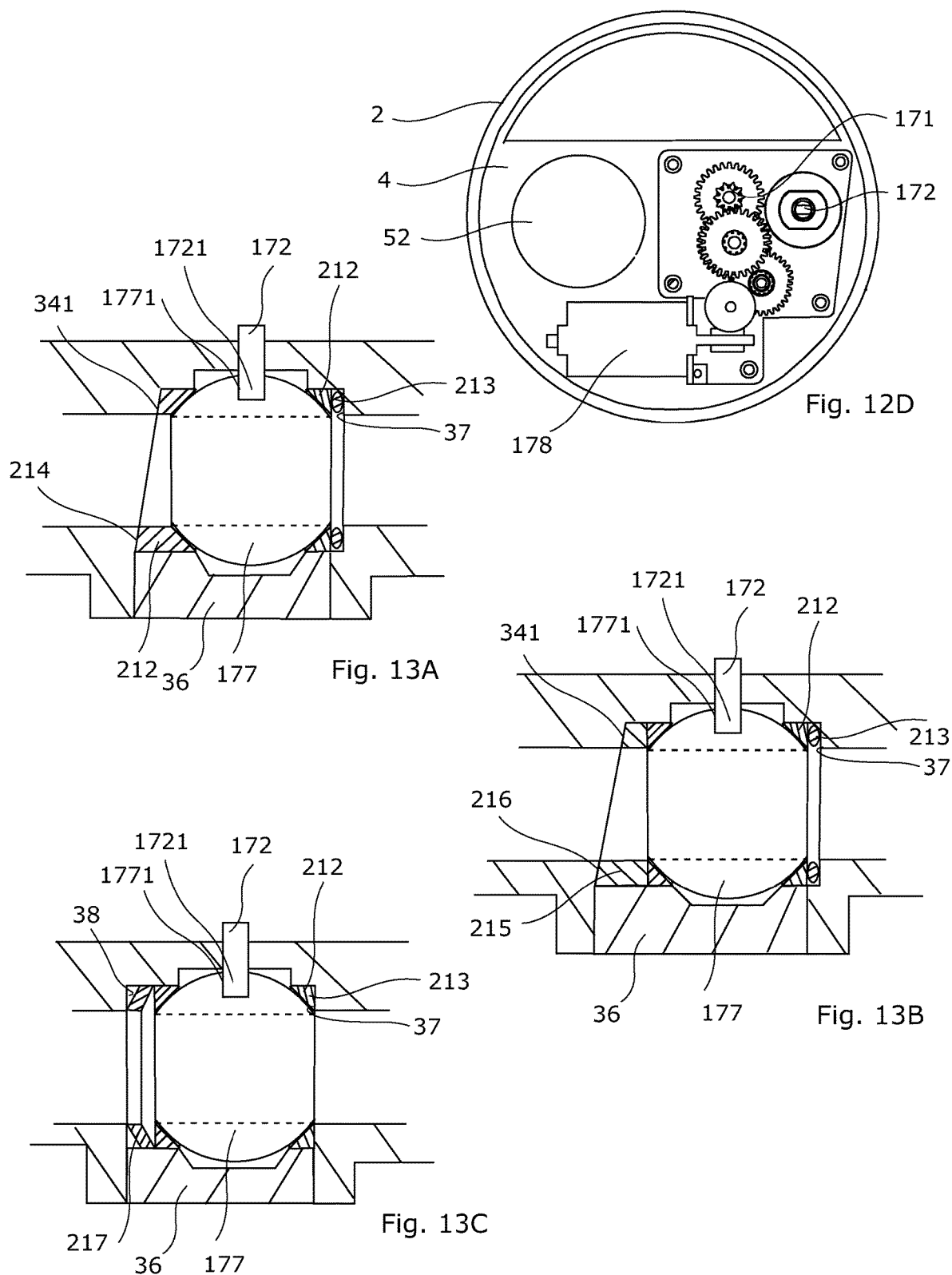

WATER METER PLATFORM

This application is a national phase of International Application No. PCT/DK2017/050129 filed Apr. 28, 2017 and published in the English language, which is an International Application of and claims benefit of priority to Patent Application No. PA 2016 70266, filed on Apr. 28, 2016 and PA 2017 70135, filed on Feb. 23, 2017. The disclosures of the above-referenced applications are hereby expressly incorporated by reference in their entireties.

FIELD OF THE INVENTION

The present invention relates to a water meter platform including a housing component providing a flow tube, a sealable main compartment adapted to house a meter unit for measuring a flow of a fluid flowing through the flow tube and a flow channel interface in fluid communication with the flow tube adapted for mounting additional functional units.

BACKGROUND OF THE INVENTION

Today water meters are primarily used to measure or meter water consumption at consumption site for billing purposes. Utilities may collect measurements using an advanced meter infrastructure (AMI), drive by solutions (AMR) or other data collection solutions. In addition to metering, known water meters, also known as smart meters, may include other functionalities such as leakage surveillance or temperature control. A remote controlled shut-off valve may also be mounted at a consumption site to control the supply of water. The shut-off valve may be operated remotely by the utility company or by the consumer for example if a leak has been detected or due to non-payment of bills. Both smart meter and shut-off valve may be remote controllable and configured to communicate via radio frequency communication or other wireless communication standards.

Installing smart water meters and shut-off valves at a multitude of consumption sites constitutes a substantial investment for utility companies, both in term of procurement of equipment and installation. A need therefore exists for a cost effective solution providing both metering and shut-off valve functionality. In the future a need may also arise for other functionality, such as sensors, to be associated with the consumption site or incorporated into the water meter. However, installation costs associated with such additional equipment may constitute considerable barriers to adoption of new technology.

OBJECT OF THE INVENTION

An object of the present invention is to provide an alternative to the prior art. In particular, it may be seen as a further object to provide an integrated water meter platform configured for installation of various functional modules. More specifically, it is an object to provide a water meter with an integrated shut-off valve.

SUMMARY OF THE INVENTION

Thus, the above described object and several other objects are intended to be obtained in a first aspect of the invention by providing a water meter platform, including: a housing component comprising a flow tube providing a flow channel extending between an inlet and an outlet, and a sealable main compartment sharing a common wall with the flow tube, the main compartment being configured to provide a housing for a meter unit including a measurement circuit having one or more ultrasonic transducers for measuring a flow of a fluid flowing in the flow channel; wherein the housing component further provides a flow channel interface in fluid communication with the flow tube and adapted for mounting an auxiliary functional unit; and in that the housing component is a monolithic polymer structure adapted to be cast as a single component in one machine cycle.

By a single component, cast in one machine cycle, is meant a component that may be cast in a single casting process without the need for subsequent machining operations or requiring subsequent assembly of sub components. Notwithstanding the above, one machine cycle or single casting process may incorporate molds provided with multiple moving cores and multiple injection nozzles.

By providing a monolithic polymer housing adapted to be cast as a single component, the cost of producing the housing component is considerably reduced. Further, integrating multiple functionalities in a single monolithic structure, eliminates problems related to assembly of different functional units, including impermeability of connections. Further, by the housing component comprising a flow channel interface, additional functional modules may optionally be installed either before or after installation of a water meter comprising such housing. The housing component thus provides a flexible water meter platform allowing installation of various functional modules.

According to a further aspect of the invention, the water meter platform may comprise a remote controllable valve unit arranged in association with the flow channel interface and configured to interrupt flow in the flow channel. Additionally, the remote controllable valve unit may include a motorized shut-off valve comprising a valve control circuit and a valve piston displaceable arranged to interrupt flow though the flow channel.

Further, the valve unit may comprise a radio communication device for near field communication with a radio communication device arranged in the main compartment and/or a radio communication device for longer range communication with external receivers and transmitters. The radio communication device may be configured for one-way communication to receive commands for controlling the valve position. Alternatively, the radio communication device may be configured for two-way communication to both receive commands and transmit valve related data, such as valve position, battery information, etc.

Still further, first and a second gaskets may be arranged around the valve piston with a mutual distance defining a seal space to provide a seal against fluid from the flow channel, and wherein a drain channel, in fluid communication with the seal space, is provided to drain away fluid entering the seal space.

According to another aspect, the above described housing component may be shaped and dimensioned so as to allow one or more cores of an injection mold to be retracted from the cavities of the housing component, following injection of a polymer injected into the mold to create the housing component. In particular, the dimensions of the cavities of the housing component may be gradually decreasing from an outer perimeter of the housing component towards a center of the housing component, to allow one or more cores of an injection mold to be retracted from the cavities of the housing component.

According to another aspect of the invention, the above described water meter may comprise a sensor unit arranged in association with the flow channel interface and configured to sense characteristics of a fluid flowing in the flow tube.

Alternatively, the water meter platform may comprise two or more flow channel interfaces, and a remote controllable valve unit may be arranged in association with a first flow channel interface and a sensor unit may be arranged in association with a second flow channel interface.

Moreover, in a water meter as described above, the flow channel interface may be defined by a circumferential wall extending from the flow tube, and the circumferential wall may be provided with a thread or other connection means for mounting auxiliary functional units. Furthermore, a self-contained power supply for powering both the meter unit and an auxiliary functional unit arranged in association with the flow channel interface, such as a valve unit, may be arranged inside the main compartment.

Additionally, the circumferential wall defining the flow channel interface may be provided with an electrical contact configured to electrically connect electrical components of an auxiliary functional unit mounted in association with the flow channel interface with electrical components arranged in the main compartment. Further, a conductive material may be integrated in the housing component to provide a wiring between the electrical contact at the flow channel interface and a corresponding electrical contact provided in association with the main compartment. Hereby electrical components in the main compartment, such as the self-contained power supply, and electrical components arranged in association with the flow channel interface, such as the valve control circuit, may be connected.

According to a further aspect of the invention, the flow channel interface may be defined inside the main compartment by a circumferential wall extending from the common wall between the main compartment and the flow tube, and the flow channel interface may be in fluid communication with the flow channel through an opening provided in the common wall inside the flow channel interface. Additionally, the flow channel interface may be configured to be sealed in relation to the main compartment. Furthermore, the measurement circuit of the meter unit, a control circuit of an auxiliary unit and a self-contained power supply for powering both circuits may be arranged inside the main compartment.

In one embodiment the water meter platform may including: a housing component being a monolithic polymer structure, providing: a flow tube having a flow channel extending between an inlet and an outlet, a sealable main compartment sharing a common wall with the flow tube, and a flow channel interface (6) in fluid communication with the flow channel; a meter unit including a measurement circuit having one or more ultrasonic transducers for measuring a flow of a fluid flowing through the flow tube; and a remote controllable valve unit arranged in association with the flow channel interface and configured to interrupt flow though the flow tube; wherein the flow channel interface is defined inside the main compartment and the meter unit, the valve unit and a self-contained power supply for powering both the meter unit and the valve unit are arranged inside the main compartment.

Additionally, the remote controllable valve unit arranged inside the main compartment, may include a motorized shut-off valve comprising a valve control circuit and an electrical motor cooperating with a gearing to control a blocking member arranged to interrupt flow though the flow tube. The electrical motor may cooperate with a valve piston displaceably arranged to interrupt flow though the flow tube. Alternatively, the electrical motor may cooperate with a valve stem cooperating with a rotatable valve ball arranged to interrupt flow though the flow tube.

Further, the water meter platform may comprise a communication device arranged inside the main compartment, configured to receive measurement data from the meter unit and valve data from the valve unit and to transmit such data via one or more radio frequency bands.

Moreover, when the valve unit is arranged inside the main compartment first and a second gaskets may be are arranged around the valve piston or the valve stem with a mutual distance defining a seal space to provide a seal against fluid from the flow channel, and a drain channel, in fluid communication with the seal space, may be provided to drain away fluid entering the seal space. The drain channel may be provided in a circumferential wall defining the flow channel interface.

Furthermore, the housing component may be provided with a valve bore for insertion of a valve ball unit comprising the valve ball, into the flow channel. The valve bore may have at least one tapered side face providing a valve bore narrowing towards the flow channel.

Additionally, the valve ball unit may comprise at least one valve seat element for supporting the valve ball, the valve seat element having a tapered side face configured for abutting the tapered side face of the valve bore. Also, a spring element may be arranged inside the housing component to force the valve ball unit towards a sealing element to provide a seal between the valve ball unit and a face of the flow channel.

Still further, the valve ball may comprise a recess adapted for engaging with a distal end of the valve stem when the valve ball is inserted into the flow channel though the valve bore. Also, the valve bore may be provided with a closure plug for sealing of the valve bore and fixating the valve bore unit inside the housing component.

The present invention further relates to a water meter housing component comprising: a flow tube providing a flow channel extending between an inlet and an outlet, a sealable main compartment sharing a common wall with the flow tube, the main compartment being configured to provide a housing for a meter unit; and a flow channel interface for mounting auxiliary functional units, wherein the flow channel is provided inside the main compartment and the housing component is a monolithic polymer structure adapted to be cast as a single component in one machine cycle.

The above disclosed aspects of the present invention may each be combined with any of the other aspects. These and other aspects of the invention will be apparent from and elucidated with reference to the embodiments described hereinafter.

BRIEF DESCRIPTION OF THE FIGURES

The water meter platform and housing component according to the invention will now be described in more detail with regard to the accompanying figures. The figures show one way of implementing the present invention and is not to be construed as being limiting to other possible embodiments falling within the scope of the attached claim set.

FIGS. 6A and 6B show another embodiment of a shut-off valve integrated with a water meter, FIG. 7 shows a cross-section of a water meter with an integrated sensor unit, FIG. 8 shows a cross-section of a water meter with two functional units mounted, FIG. 9 shows another embodiment of a housing component for a water meter platform, FIG. 10 shows a top-view of the housing of FIG. 9, FIG. 11 shows a cross-sections of the housing of FIG. 9, FIGS. 12A and 12B show still another embodiment of a water meter platform, FIG. 12C shows a cross-section of the water meter platform shown in FIGS. 12A and 12B along line KK, FIG. 12D shows motor and gearing of the water meter platform shown in FIGS. 12A and 12B, and FIGS. 13A-13C show different design for a bottom-entry ball valve.

DETAILED DESCRIPTION OF AN EMBODIMENT

Figure 1:
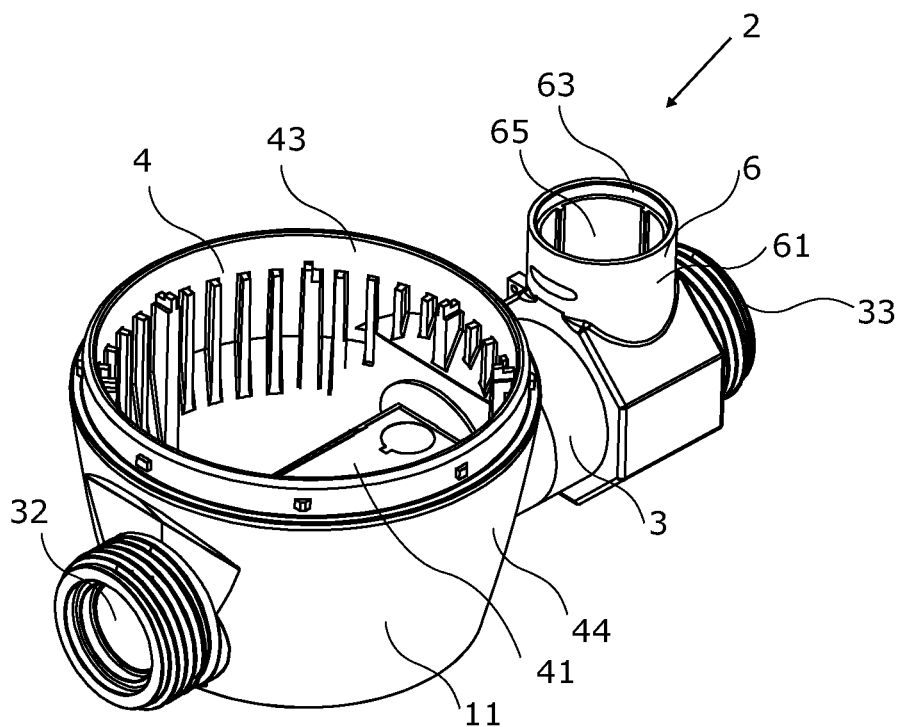
FIG. 1 shows a housing component for a water meter platform.
Figure 2:
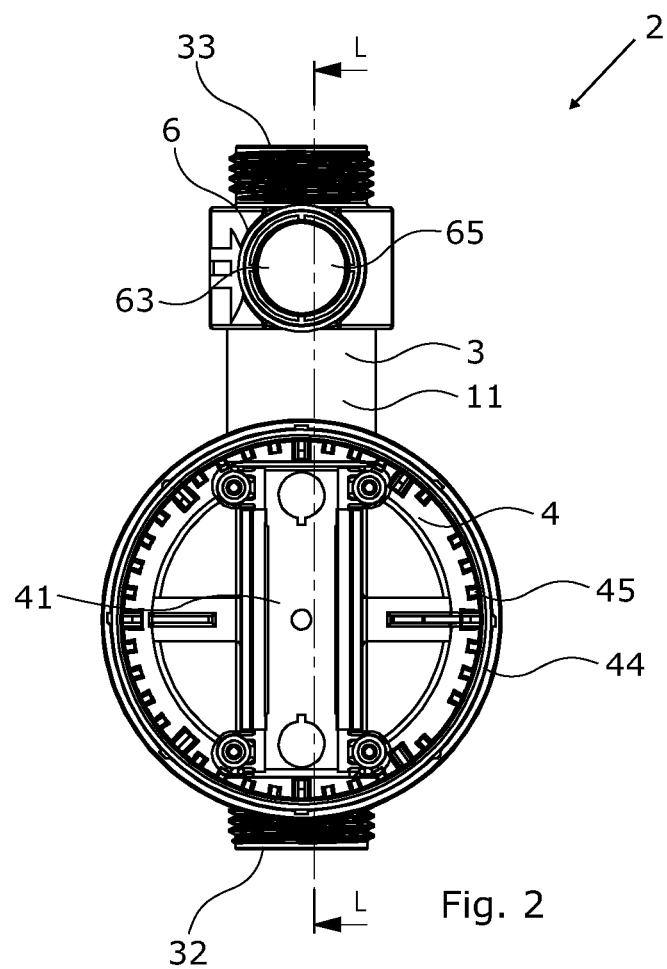
FIG. 2 shows a top-view of the housing of FIG. 1.

FIGS. 1 and 2 show a housing component 2 for a water meter platform, providing a main compartment 4 and a flow channel interface 6. The housing component also comprises a flow tube 3 providing a flow channel 31 extending between an inlet 32 and an outlet 33. Fluid may thus flows into the flow tube through the inlet, through the flow channel and out through the outlet. In the embodiment shown in FIG. 1, the main compartment and the flow tube share a common wall 41, but there is no communication between the main compartment and the flow channel. The main compartment is configured to provide a housing for a meter unit comprising a measurement circuit for measuring the flow of a fluid flowing through the flow channel. Additionally, the main compartment may house other electronic devices, such as a communication device as will be further described below.

The flow channel interface 6 is constituted by a circumferential wall 61 defining an inner cavity 65. The circumferential wall extends from the flow tube and an opening 63 is provided in the wall of the flow tube inside the circumferential wall. Through the opening 63 the inner cavity 65 is in direct communication with the flow channel. Further, the flow channel interface is provided with an upper opening 64 at an upper end of the circumferential wall. Hereby an interface 6 for mounting functional units on the housing component is provided, as will be further described below.

The housing component 2 is configured to be manufactured as a monolithic polymer structure 11 adapted to be cast as a single component. For a component to be cast as a monolithic structure, certain design requirements has to be fulfilled. In one aspect cores of a mold (not shown) used for injection molding must be retractable. In the present invention this has been achieved by designing the housing component with cavity dimensions that gradually decrease from an outer perimeter of the housing component towards its center. The housing components described so far comprise three main cavities, the main compartment 4, the cavity 65 of the flow channel interface 6, and the flow channel 31. All of these cavities have an overall tapered shape with a diameter or cross-sectional dimension that decreases from a point of entry of a mold core towards the center of the component. For example, the cross-sectional dimension of the upper opening 43 of the main compartment is larger than the cross-sectional dimension of the main compartment at the common wall between the main compartment and flow channel. Furthermore, the opening 64 in the upper part of the flow channel interface has a larger diameter than the opening 63 between the flow channel interface and the flow channel. Finally, the diameter of the flow channel at the inlet 32 and the outlet 33 of the flow tube, respectively, are larger than or equal to the diameter of the flow channel at any point between the two.

Referring to FIG. 1-3A, the housing component is provided with threaded sections at the inlet and the outlet of the flow tube for connecting the housing component to existing piping at a consumption site. The main compartment is defined by a circumferential wall 44 extending partially from the flow tube. The flow tube thus constitutes part of the bottom of the main compartment and the main compartment is arranged both on top of and along the sides of the flow tube. More specifically, in the embodiments shown, the main compartment is defined by a bottom wall (40) extending from the flow tube in a plane parallel there with, by the flow tube itself and by the circumferential wall 44. The circumferential wall connects with the bottom wall along a bottom outer perimeter and with the flow tube to provide a cup-shaped cavity having an upper opening. Further, it can be seen that part of the flow tube intersects the cavity, whereby sections of the wall of the flow tube are arranged inside the cavity. In another embodiment, the flow tube may be arranged exterior to the cavity and part of the flow tube may constitute part of the bottom wall. Hereby the material of the bottom wall becomes the only barrier between the main compartment and the flow channel. Additionally, the circumferential wall is provided with reinforcement ribs 45 along its inner perimeter to improve strength and stability of the housing component.

Figure 4:
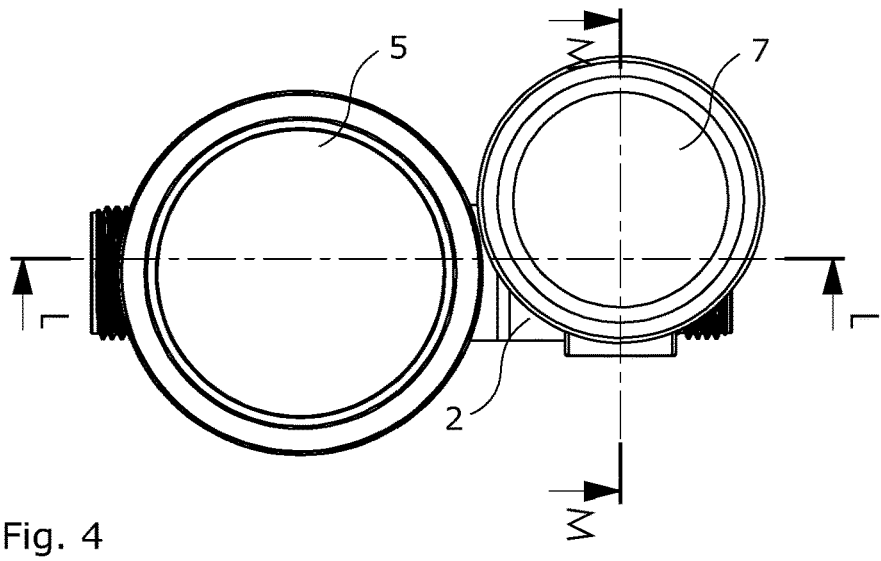
FIG. 4 shows a top-view of a water meter with an integrated shut-off valve.

Referring to FIG. 4-6 a water meter platform according to one embodiments of the invention is shown. The water meter platform comprises a housing component as described above. Inside the main compartment a meter unit 5 comprising a measurement circuit 50 including two ultrasonic transducers 51 is provided. The ultrasonic transducers are arranged at the common wall 41 and configured to continuously transmit and receive ultrasonic signals, respectively. The signal propagate through the common wall and a fluid in the flow channel and by analyzing the transmitted and received signals, the measurement circuit is able to measure the amount of fluid flowing in the flow channel. As envisaged by the skilled person, other types of measuring technologies and principles may alternatively be used for a meter unit arranged in the main compartment to measure the flow through the flow channel. Examples of such alternative technologies is magnetic-inductive flow measurement.

The meter unit 5 further comprises a communication device 9 configured to receive measurement data either directly or indirectly from the measurement circuit 50, such as from a non-volatile memory and transmit the measurement data to a remote location. The communication device may also be configured to receive other data, such as software updates or commands, from a remote location and forward such data to the measurements circuit or other parts of the water meter platform. In one embodiment, the communication device 9 is a radio communication device configured to transmit and receive data via one or more radio frequency bands. Moreover, a self-contained power supply 52 in the form of a battery is arranged in the main compartment adapted to power the measurement circuit, memory and communication device.

Figure 5A:
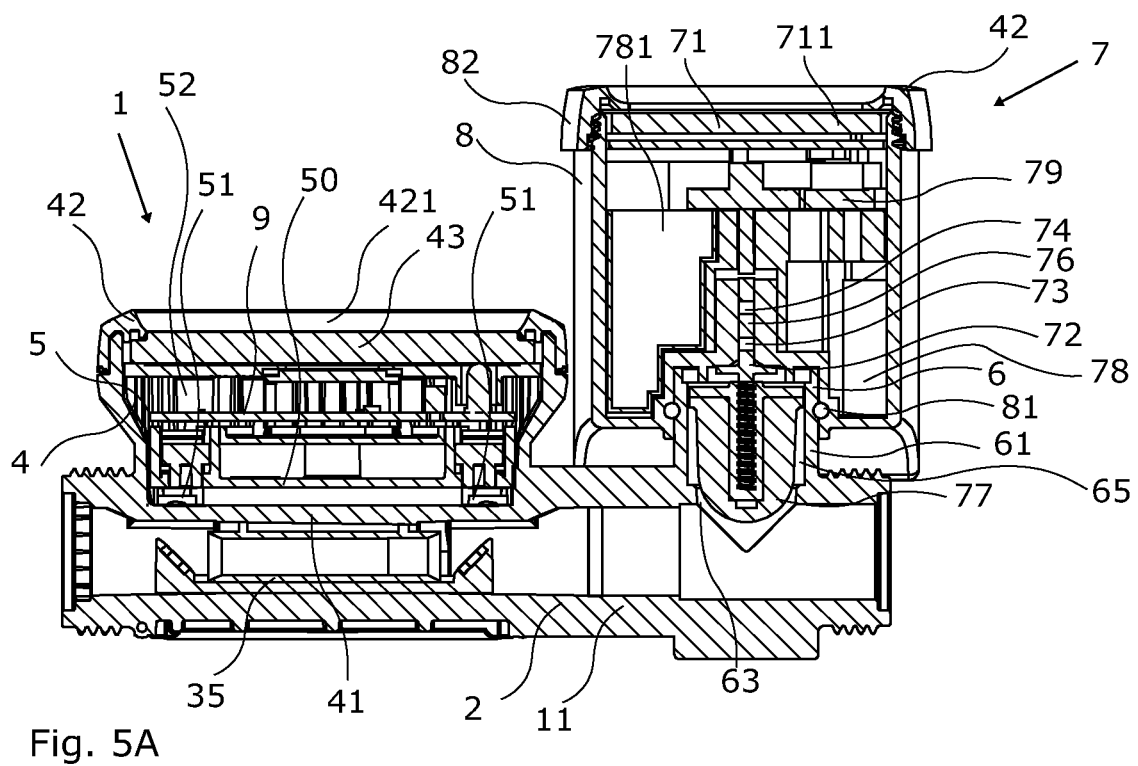
FIG. 5A shows a cross-section of the water meter of FIG. 4 along line LL.

Still referring to FIG. 5A, the main compartment 4 is sealed by a closing member 42, such as a lid, arranged to cover its upper opening 43. The closing member may incorporate a transparent element 421 providing a window through which a display showing measurement data or other information may be visible. Further, a gasket or other sealing member is arranged between the exterior wall of the main compartment and the lid, to provide a hermetical seal. Inside the flow tube a flow guide 35 is arranged to create optimal flow conditions in the measurement area between the ultrasonic transducers. The flow guide is typically a separate component inserted into the flow tube via the inlet or outlet.

A valve unit 7 is mounted on the flow channel interface 6. In the shown embodiment the valve unit comprises a valve piston 72 displaceable arranged in the cavity 65 of the flow channel interface. The valve piston includes a blocking member 77 arranged to be displaced into the flow tube to partly of fully block the flow channel. By partly or fully blocking the flow channel fluid flowing through the flow tube may be controlled. The flow may be completely stopped or only throttled to a desired level. A throttling functionality may be required in jurisdictions wherein a complete cut-off of the water supply is not allowed. Throttling may also be used to control or limit the supply of water, if water is a scarce resource that needs to be rationed.

The shown embodiment of the valve unit is provided with a type of linear motion valve having a closure or blocking member that moves in a straight line. The blocking member is substantially cone-shaped and corresponding to the geometry of the flow channel. It is readily understood by the skilled person that other types of vales and blocking members may also be used without departing from the scope of the invention. Alternatively, the blocking member may be a sliding gate or of other geometries. Alternatively, the valve unit may be provided with another type of valve, a globe valve, a check valve or a diaphragm based valve.

As seen from FIG. 5A, the valve unit comprises a valve unit housing 8 mounted on the flow channel interface 6. The housing 8 may be mounted by a thread provided at the outer surface of the circumferential wall or by other mounting means, such as a snap-connection or screws. Additionally, a gasket 81 is provided between the housing and the circumferential wall to provide a fluid tight seal preventing fluid from leaking from the flow tube. Further, the housing is provided with a closing member to seal off an inner cavity of the valve unit housing. Inside the housing an electrical motor 78 cooperating with a gearing 79 to drive the valve piston is provided. The valve unit further comprises a radio communication device 711 for establishing near field communication with the radio communication device 9 associated with the water meter unit arranged in the main compartment. Alternatively, the radio communication device 711 may be configured to communicate with external receivers and transmitters, such as collectors or concentrators of an advanced meter infrastructure. The radio communication device of the valve unit may also be configured to communicate using existing telecommunication infrastructure, such as GSM, 3G or 4G. Additionally, a self-contained power supply 781 in the form of a battery is provided in the valve unit housing to power the electrical motor, the communication device and possible other electrical components of the valve unit.

As described above, the valve unit communication device may communicate with the water meter unit communication device arranged in the main compartment. The valve unit communication device may thus be configured for short distance communication, e.g. using existing near field communication technology, requiring less power than long range radio communication. To remote-control the valve unit, i.e. the position of the valve piston and the blocking member, commands may be transmitted to the meter unit radio communication device. These commands are then relayed to the valve unit communication device. Commands received by the meter unit communication device may also be processed by the meter unit before being transmitted to the valve unit. Similar, if the valve unit is configured for two-way communication, data is first transmitted from the valve unit communication device to the meter unit communication device. The meter unit communication device then either directly relays the data or stores the data for later transmittal, e.g. in a data package together with meter data.

Figure 5B:
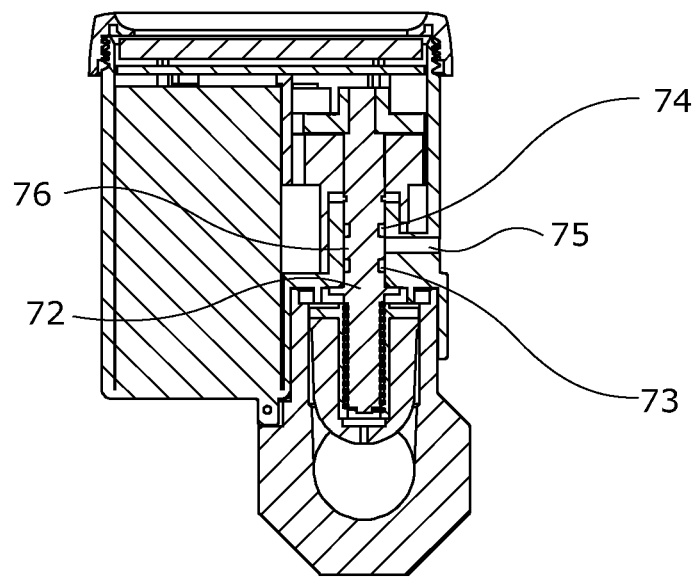
FIG. 5B shows a cross-section of the water meter of FIG. 4 along line MM.

Referring to FIG. 5B, further details of the valve unit are disclosed. To provide a hermetically sealed valve housing, a first gasket 73 and a second gasket 74 are arranged around the valve piston 72 to seal-off the valve housing from the flow channel. The first and second gaskets are arranged with a mutual distance apart defining a seal space 76, and a drain channel 75 in fluid communication with the seal space is provided in the valve unit housing. Hereby any fluid that may enter the seal space from the flow channel is drained away from the seal space to provide a hermetically sealed valve housing. In use, the amount of fluid lead away from the seal space will be very limited and the water is directed to the exterior of the valve housing to drip away.

Referring to FIGS. 6A and 6B, another embodiment of a valve unit 7 mounted on the flow channel interface 6 is shown. In the shown embodiment the valve unit is provided with a ball valve mechanism comprising a blocking member in the form of a rotatable valve ball 177 arranged in the flow channel. The valve ball comprises a first through-going passage and by controlling the orientation of the valve ball, the flow through the flow channel may be controlled. To only reduce the flow through the flow channel, the valve ball may comprise a second through-going passage (not shown) of reduced diameter compared to the first through-going passage. The valve ball is driven by a valve stem 172 extending from the ball valve, through the cavity 65 and up above the flow channel interface. The valve stem is operationally connected to an electrical motor 178 via a gearing 179 and by rotating the valve stem and ball, the flow through the flow channel may be partly of fully blocked. Similar to the previous described embodiment, first and second gasket 173, 174 are arranged around the valve stem to provide a seal against the flow channel. Further, additional gaskets 175 are arranged around a part of the valve stem extending into the valve unit housing 8. The shown ball vale is based on the design principles of what may be considered a side-entry ball valve. To provide an opening for receiving the valve ball into the housing component 2, the diameter of a section for the flow channel 31 is enlarged, as shown in FIG. 6A. Further, the housing component is provided with an internal thread 311 configured for cooperating with a thread 211 of a closure element 21. Inside the housing component, the valve ball is supported by valve seat elements 212 and O-rings are provided between the valve seat elements and internal faces of the housing component and the closure element. The O-rings serve as sealing means and provides resilience to construction reducing friction between the valve ball and seats. The resilience provided by the O-rings may also reduce or prevent calcification thereby preventing the valve ball from getting stuck following a period wherein the valve has not been turned.

Referring to FIG. 7, a water meter platform according to another embodiments of the invention is shown. The water meter platform is similar in construction to the water meter platform described above with the exception that another functional unit is provided at the flow channel interface. In the above described embodiment a valve unit was provided as the functional unit. In the present embodiment a sensor unit 9 is provided as the functional unit. The sensor unit 9 is provided partially in the cavity of the flow channel interface and configured to communicate with fluid in the flow channel through the opening 63. In other embodiments (not shown) the part of the sensor unit may also extend into the fluid channel.

As seen from FIG. 7, the sensor 9 unit comprises a sensor unit housing 91 mounted on the flow channel interface 6. The housing 91 may be mounted by a thread provided at the outer surface of the circumferential wall or by other mounting means, and a gasket 94 is provided between the housing and the circumferential wall to provide a fluid tight seal. Additionally, the housing is provided with a closing member to seal off the inner cavity of the sensor unit housing. Inside the housing, sensor electronics 92 are provided. Similar to the valve unit, the sensor unit comprises a radio communication device 93 for communicating with the radio communication device 9 of the meter unit or other external receivers and transmitters. The principles of communication of the sensor unit are identical to those described above in association with the valve unit, and will thus not be further described.

Still referring to FIG. 7, the sensor unit 9 comprises a sensor probe 95 arranged to extend into fluid flowing in the flow channel. The sensor probe may include various types of sensors, such as a chlorine sensor, a temperature sensor or a microbiological sensor for sensing the presence of *Escherichia coli* (*E. coli*) bacteria or other contaminants in the water supply. The sensor probe communicates with the sensor electronics 92 inside the sensor unit housing, and a gasket 94 is provided around the sensor probe at the point of intersection with the sensor unit housing. Hereby a platform for mounting an in-line water sensor in association with a water meter is provided. Referring to FIG. 8, yet another embodiment of a water meter platform is shown. The water meter platform comprises a housing component comprising a main compartment and two flow channel interfaces. The housing component is similar in construction to the previously described housing components, with the exception that an additional second flow channel interface is provided. The second flow channel interface is similar in construction to the flow channel interfaces described above. The second flow channel interface thus provides a means for mounting an additional functional unit. By comprising two flow channel interfaces, two functional units may be mounted together with a meter unit. The water meter platform shown in FIG. 8 comprises a meter unit 5, a valve unit 7 and a sensor unit 8 as described above. The valve unit 7 and the sensor unit 8 may both communicate with the meter unit 5, which then relays data to and/or from the respective functional units. Alternatively, the valve unit 7 and the sensor unit 8 may communicate directly with other external receivers and transmitters.

In all of the above described embodiments the meter unit may function as a communication hub or router device that controls communication to and from all functional units of the water meter platform. Hereby short range communication requiring less power may be used by some of the functional units, with only one unit being configured for long range communication. A further advantage in this respect is the reduced amount of data that has to be transmitted from the water meter platform, which may reduce the risk of data package collision and communication network congestion.

Figure 3A:
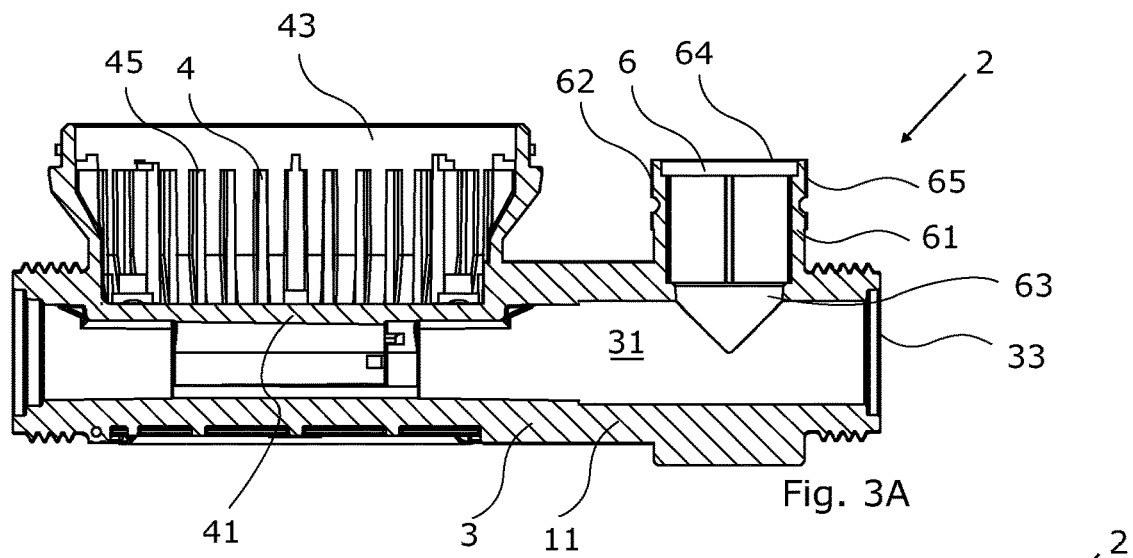
FIGS. 3A and 3B show cross-sections of different embodiments of the housing of FIG. 1.
Figure 3B:
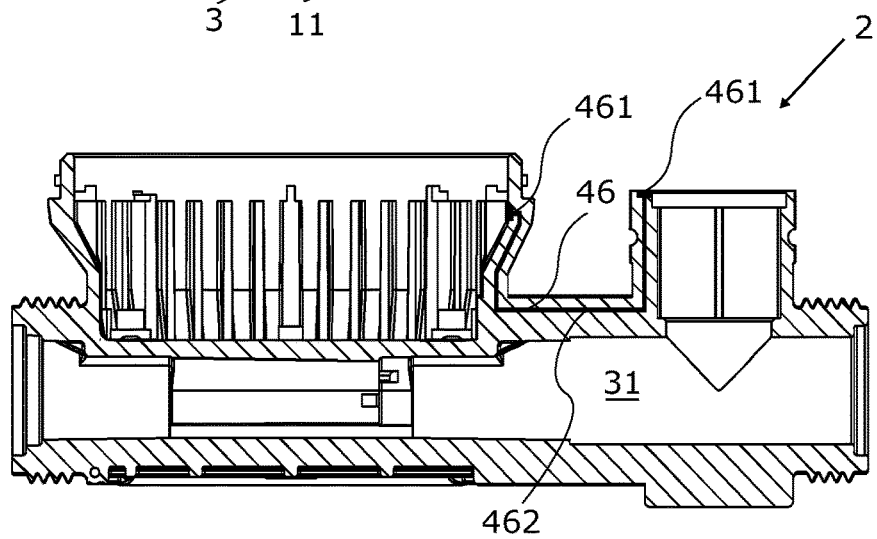

Referring to FIG. 3B, in one embodiment the housing component is provided with an integrated wiring system 46 arranged to provide an electrical connection between the main compartment and the flow channel interface. The wiring system comprises contacts 461 provided in the surface of the housing component inside the main compartment and in the circumferential wall of the flow channel interface. The contacts are electrically connected by an electrical conductor 462 in the form of a conductive material integrated with the housing component. In one exemplary embodiment, the conductive material may be pieces of metal wiring integrated with the housing component by an insert molding process. Alternatively, a part of the electrical conductor may be applied to a surface of the housing component after molding and electrically connected with the contacts via feedthrough electrical connections (not shown) provided in the housing component. Electrical devices arranged in the main compartment, such as a printed circuit board (PCB) including a pair of contacts, may be electrically connected to the wiring system 46 via the contact point 461 in the main compartment. Similar, electrical components of an auxiliary functional unit may be electrically connected to the wiring system via the contact point provided at the interface 6, either directly or via a feedthrough (not shown) provided in the housing of the functional unit. Functional units mounted in association with the flow channel interface may thus be electrically connected with electrical components arranged in the main compartment, such as the communication device 9 and the self-contained power supply 52.

In one embodiment of the above described water meter platform, the self-contained power supply 52 arranged in the main compartment may be electrically connected with the valve unit and/or the sensor unit and provide the necessary power to these units. Hereby no power supply is required in the auxiliary functional units. Alternatively or additionally the electrical connection between the main compartment and the auxiliary units may be configured data communication between the communication devices of the respective units. Hereby wired communication can be implemented between the units instead of radio communication. An advantage in this respect is that data can be communicated without the same concerns for confidentiality as compared to wireless communication that may be intercepted by third parties.

FIG. 9-11 show another embodiment of a housing component 2 for a water meter platform with the flow channel interface 6 arranged inside the main compartment 4. As described above, the main compartment 4 is adapted to provide a housing for a meter unit including a measurement circuit and two ultrasonic transducers. The housing component comprises a flow tube providing a flow channel 31 extending between an inlet 32 and an outlet 33. The main compartment 4 and the flow tube share a common wall 41. The flow channel interface 6 extends from the common wall at one end of the main compartment and mounting faces for the ultrasonic transducers are provided along the common wall opposite the flow channel interface. Further, the housing component is provided with threaded sections at the inlet and the outlet of the flow tube for connecting the housing component with an existing piping installation. The main compartment is defined by a circumferential wall 44 extending partially from the flow tube. The flow tube thus constitutes part of the bottom of the main compartment and the main compartment is arranged both on top of and along sides of the flow tube. More specifically, in the embodiments shown, the main compartment is defined by a bottom wall 40 extending from the flow tube in a plane parallel there with, by the flow tube itself and by the circumferential wall. The circumferential wall connects with the bottom wall along a bottom outer perimeter and with the flow tube to provide a cup-shaped cavity having an upper opening. Further, it can be seen that part of the flow tube intersects the cavity, whereby sections of the wall of the flow tube are arranged inside the cavity. In another embodiment, the flow tube may be arranged exterior to the cavity and part of the flow tube may constitute part of the bottom wall. Hereby the material of the bottom wall becomes the only barrier between the main compartment and the flow channel. Additionally, the circumferential wall is provided with reinforcement ribs 45 along its inner perimeter to improve strength and stability of the housing component The housing component is configured to be manufactured as a monolithic polymer structure 11 adapted to be cast as a single component. The cavity dimensions of the housing component gradually decrease from an outer perimeter of the housing component towards its center. The housing component comprises three main cavities, the main compartment 4, the cavity 65 of the flow channel interface 6 arranged inside the main compartment, and the flow channel 31. All of these cavities have an overall tapered shape with a diameter or cross-sectional dimension that decreases from a point of entry of a mold core towards the center of the component. For example, the cross-sectional dimension of the upper opening 43 of the main compartment is larger than the cross-sectional dimension of the main compartment at the common wall between the main compartment and flow channel. Further, the opening 64 in the upper part of the flow channel interface has a larger diameter than the opening 63 between the flow channel interface and the flow channel. Finally, the diameter of the flow channel at the inlet 32 and the outlet 33 of the flow tube are larger than or equal to the diameter of the flow channel at any point between the two.

An advantage of providing the flow channel interface 6 inside the main compartment is that electrical components of both the meter unit and the auxiliary functional unit may be arranged inside the main compartment. The different functional units may thus be subject to integration, both in terms of function and construction. Communication between the functional units may for example be easier implemented and components may be shared, such as the power supply and the communication device. Electrical systems of the different functional units may also be implemented on one or more shared printed circuit boards. By integrating units it is possible to reduce development and production costs and create a more robust product.

Still referring to FIG. 9-1, a water meter platform comprises a housing component 2, a meter unit and a valve unit is shown. Inside the main compartment 4 the meter unit including the measurement circuit and the two ultrasonic transducers is provided. The ultrasonic transducers are arranged at the common wall 41 and configured to operate as described above, to meter a fluid flowing in the flow channel. Additionally, a valve piston is displaceably arranged in the cavity of the flow channel interface inside the main compartment. As described above, gaskets are provided around the valve piston to prevent flow channel fluid from entering the main compartment though the opening 63 in the common wall. Additional means for sealing off the cavity of the flow channel interface from the main compartment may also be provided. Inside the main compartment an electrical motor cooperating with a gearing is provided to drive the valve piston.

The meter unit further comprises a communication device configured to receive measurement data from the meter unit and valve data from the valve unit. The communication device is configured to transmit the received data to an external receiver of an automated meter infrastructure or other data collection system as described above. The communication device may be a radio communication device configured to transmit and receive data via one or more radio frequency bands. Additionally, a self-contained power supply in the form of a battery is arranged in the main compartment adapted to power the meter and valve units.

As described with the previous embodiments of the water meter platform according to the invention, the main compartment 4 may be sealed by a closing member. The closing member may incorporate a transparent element providing a window through which a display showing measurement data, valve data or data associated with other functional units may be visible. A gasket or other sealing member is arranged between the exterior wall of the main compartment and the closing member, to provide a hermetical seal. Above, it has been described that a meter unit and a valve unit may be arranged in the main compartment. The skilled person would readily understand that other functional units, such as the sensor unit described above, may alternatively be integrated with the meter unit in the main compartment.

Referring to FIG. 12-14, another embodiment of a water meter platform is shown. The water meter platform comprises a housing component, a meter unit and a valve unit. The housing component is configured to be manufactured as a monolithic polymer structure 11 adapted to be cast as a single component and is predominantly similar in construction to the housing component described above. However, the housing component of the present embodiment differs in that the length between the inlet and the outlet, also referred to as the lay-length, is shorter and the main compartment is of a circular shape. More specifically, the length of the housing component between the inlet and the outlet may be from 110 mm to 220 mm, preferably from 110 mm to 150 mm. Further, part of the flow channel is configured to receive a valve ball and an opening configured for inserting the valve ball into the flow channel is provided in a bottom part of the housing component.

As the previous described housing components configured for housing both a meter unit and a valve unit, the flow channel interface 6 is arranged inside the main compartment 4. Further, the main compartment 4 is adapted to provide a housing for a meter unit including a measurement circuit and two ultrasonic transducers. The housing component comprises a flow tube 3 providing a flow channel 31 extending between an inlet 32 and an outlet 33. The main compartment 4 and the flow tube share a common wall 41. The flow channel interface 6 extends from the common wall at one end of the main compartment and mounting faces for the ultrasonic transducers are provided along the common wall opposite the flow channel interface. Further, the housing component is provided with threaded sections at the inlet and the outlet of the flow tube for connecting the housing component with an existing piping installation. Similar to the previous described embodiments, the main compartment is defined by a circumferential wall 44, the flow tube 3 and a bottom wall 40.

As shown in FIG. 12C, the valve unit is provided with a ball valve mechanism comprising a rotatable valve ball 177 arranged in the flow channel. The valve ball is driven by a valve stem 172 extending from the ball valve, through the cavity 65 of the flow channel interface and up above the flow channel interface 6. The valve stem is operationally connected to an electrical motor 178 via a gearing 179 and by rotating the valve stem and ball, the flow through the flow channel may be partly of fully blocked. First and second gasket 173, 174 are arranged around the valve stem to provide a seal against the flow channel. Between the gaskets a seal space 76 is defined for collecting fluid escaping from the flow channel along the valve stem. To drain away the fluid, a drain channel 75 communicating with the seal space is provided through part of the housing component adjacent the cavity 65 of the flow channel interface.

The shown ball vale is based on the design principles of what may be considered a bottom-entry ball valve. The inner diameter of a section for the flow channel 31 is enlarged to provide room for a valve ball 177 and a valve bore 34 communicating with flow channel is provided in a bottom part of the housing component. The valve bore extends from a face of the housing component external to the main compartment. In the figures the valve bore is shown to extend from a bottom face of the housing component. Alternatively, the valve bore may extend sideways into the flow channel. The valve bore is adapted insertion of a valve ball unit 180 including a valve ball 177, valve seat elements 212, sealing elements and possible additional fixation devices into the housing component. Following insertion of the valve ball unit, the valve bore 34 is closed by a closure plug 36.

When the valve ball unit is arranged inside the housing component, the closure plug 36 further serves to fixate the valve ball unit and ensure proper engagement between a distal end 1721 of the valve stem 172 and a recess 1771 in the valve ball. Alternatively, the valve ball may be fixated to the valve stem prior to insertion of the stem and valve ball unit into the housing component.

FIG. 12C only show a schematic representation of the construction of a ball valve. Referring to FIGS. 13A-C, various embodiments of a ball valve integrated in a housing component are shown in greater detail. In FIG. 13A, the valve ball unit is inserted into a conical valve bore with a tapered side face 341. In the shown embodiment, only part of the side wall is shown to be tapered, however the entire side wall or all side walls may be tapered depending on the configuration of the valve bore. The valve ball unit 180 includes the valve ball 177 supported by two valve seat elements 212. The valve seat elements may be of a material such as PTFE or Teflon® or other suitable material known to the skilled person. One of the valve seat elements is provided with a tapered face 214 corresponding to the conical geometry of the valve bore. Thereby the valve seat element abuts the tapered side face of the valve bore to support the valve ball. The other valve seat element is arranged to cooperate with a sealing element 213, such as an O-ring or other gasket material, arranged to provide a seal against a shoulder face 37 of the flow channel provided by the change in inner diameter. Further, as seen from FIG. 13A, the section of enlarged diameter provides a recess for receiving the sealing element, and during assembly the sealing element may be arranged in the recess followed by the valve ball unit being inserted into the valve bore. The conical geometry of the valve bore and the valve seat elements ensures that the valve unit is properly forced against the sealing element when the valve ball unit is secured in the valve bore.

In the embodiment of FIG. 13B, the valve ball unit is also arranged in a tapered valve bore. However, in this embodiment the valve ball unit 180 unit is forced against the sealing element by a wedge element 215 arranged together with the ball valve unit in the valve bore. The wedge element has a tapered face 216 corresponding to the conical geometry of the valve bore and another substantially vertical face for abutting the valve seat element. An advantage of the wedge element is that standard and identical valve seat elements may be used for supporting the valve ball.

Referring to FIG. 13C, another embodiment is shown wherein the valve ball unit 180 is inserted into a valve bore having substantial vertical or parallel side faces. A spring element 217 is provided between the valve ball unit 180 and another shoulder face 38 provided by the section of the flow channel 31 having an enlarged inner diameter. The spring element thus forces the valve ball unit is a longitudinal direction parallel to the flow channel and perpendicular to the valve bore for inserting the valve ball unit into the housing component. The spring element serves to force the valve seat elements 212 towards the shoulder face 37, thereby providing a sealing effect between the two. The valve seat element thus also functions as a sealing element 213 and the spring element further serves to fixate the valve ball unit inside the valve bore. The spring element may be a separate item inserted into the valve bore together with the valve ball unit or be an integrated part of one of the valve seat elements (not shown). In FIG. 13C the spring element 217 is embodies as a cup spring, however other types of springs or resilient members of sufficient elasticity may also be used. Additionally, as disclosed with the embodiment of FIG. 13B, a sealing element, such as an O-ring or other gasket material (not shown), may be arranged to provide a seal between the one of the valve seat elements and its corresponding the shoulder face. Finally, it can be seen that the closure plug 36 served to fixate both the spring element and the valve ball unit inside the housing component.

As envisaged by the skilled person, the valve unit described in relation to FIGS. 12-14 may also be used in combination with the housing component shown in FIG. 9-11.

The water meter platform shown in FIG. 12-14 further comprises a communication device configured to receive measurement data from the meter unit and valve data from the valve unit. The communication device is configured to transmit the received data to an external receiver of an automated meter infrastructure or other data collection system as described above. The communication device may be a radio communication device configured to transmit and receive data via one or more radio frequency bands. Additionally, a self-contained power supply in the form of a battery is arranged in the main compartment adapted to power the meter and valve units.

Still further, the main compartment 4 may be sealed by a closing member. The closing member may incorporate a transparent element providing a window through which a display showing measurement data, valve data or data associated with other functional units may be visible. A gasket or other sealing member is arranged between the exterior wall of the main compartment and the closing member, to provide a hermetical seal.

Although the present invention has been described in connection with the specified embodiments, it should not be construed as being in any way limited to the presented examples. The mentioning of various components, elements, devices and units do not limit such entities to be separate physical entities. One or more components, elements, devices or units may be implemented in one common entity, for example by being implemented on a common PCB or as parts of an integrated circuit. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A water meter platform, including:
    a housing component being a monolithic polymer structure, the housing component providing:
        a flow tube having a flow channel extending between an inlet and an outlet,
        a sealable main compartment sharing a common wall with the flow tube, and
        a flow channel interface in fluid communication with the flow channel;
    a meter unit including a measurement circuit having one or more ultrasonic transducers for measuring a flow of a fluid flowing through the flow tube; and
    a remote controllable valve unit arranged in association with the flow channel interface and configured to interrupt flow though the flow tube;
    wherein the flow channel interface is defined inside the main compartment; and
    wherein the valve unit and a self-contained power supply for powering both the meter unit and the valve unit are arranged inside the main compartment.

2. A water meter platform according to claim 1, wherein the remote controllable valve unit includes a motorized shut-off valve comprising a valve control circuit and an electrical motor cooperating with a gearing to control a blocking member arranged to interrupt flow though the flow tube.

3. A water meter platform according to claim 1, further comprising a communication device arranged inside the main compartment, configured to receive measurement data from the meter unit and valve data from the valve unit and to transmit such data via one or more radio frequency bands.

4. A water meter platform according to claim 2, wherein the electrical motor via the gearing cooperates with a valve piston displaceably arranged to interrupt flow though the flow tube.

5. A water meter platform according to claim 2, wherein the electrical motor via the gearing cooperates with a valve stem cooperating with a rotatable valve ball arranged to interrupt flow though the flow tube.

6. A water meter platform according to claim 4, wherein first and a second gaskets are arranged around the valve piston or the valve stem with a mutual distance apart defining a seal space to provide a seal against fluid escaping from the flow channel, and wherein a drain channel, in fluid communication with the seal space, is provided to drain away fluid entering the seal space.

7. A water meter platform according to claim 1, wherein the main compartment and its upper opening is substantially circular, elliptical or has the shape of a rectangle with semicircular ends.

8. A water meter platform according to claim 1, wherein the length of the housing component between the inlet and the outlet is from 110 mm to 220 mm, more specifically from 110 mm to 150 mm.

9. A water meter platform according to claim 5, wherein the housing component is provided with a valve bore for insertion of a valve ball unit comprising the valve ball, into the flow channel.

10. A water meter platform according to claim 9, wherein the valve bore has at least one tapered side face providing a valve bore narrowing towards the flow channel.

11. A water meter platform according to claim 9, wherein the valve bore extends from a face of the housing component outside the main compartment and into the flow channel.

12. A water meter platform according to claim 10, wherein the valve ball unit further comprises at least one valve seat element for supporting the valve ball, the valve seat element having a tapered side face configured for abutting the tapered side face of the valve bore.

13. A water meter platform according to claim 9, further comprising a spring element arranged inside the housing component to force the valve ball unit in a direction substantially perpendicular to the extension of the valve bore to fixate the valve ball unit inside the housing component.

14. A water meter platform according to claim 13, wherein the spring element is adapted to force the valve ball unit towards a sealing element to provide a seal between the valve ball unit and a face of the flow channel.

15. A water meter platform according to claim 9, wherein the flow channel interface is defined by a circumferential wall extending from the common wall between the main compartment and the flow tube, and the flow channel interface is in fluid communication with the flow channel through an opening provided in the common wall inside the flow channel interface.

16. A water meter platform according to claim 15, wherein the drain channel is provided in the circumferential wall defining the flow channel interface.

17. A water meter housing component comprising:
    a flow tube providing a flow channel extending between an inlet and an outlet,
    a sealable main compartment sharing a common wall with the flow tube, the main compartment being configured to provide a housing for a meter unit a remote controllable valve unit a self-contained power supply for powering both the meter unit and the valve unit; and
    a flow channel interface for mounting auxiliary functional units,
    wherein the flow channel is provided inside the main compartment and
    wherein the housing component is a monolithic polymer structure adapted to be cast as a single component in one machine cycle.

* * * * *